June 4, 1935.  F. A. JAWORT  2,003,541
BAKER'S PEEL
Filed Oct. 16, 1934
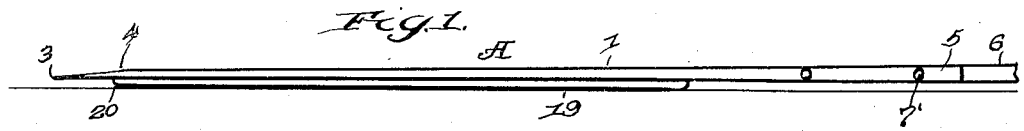
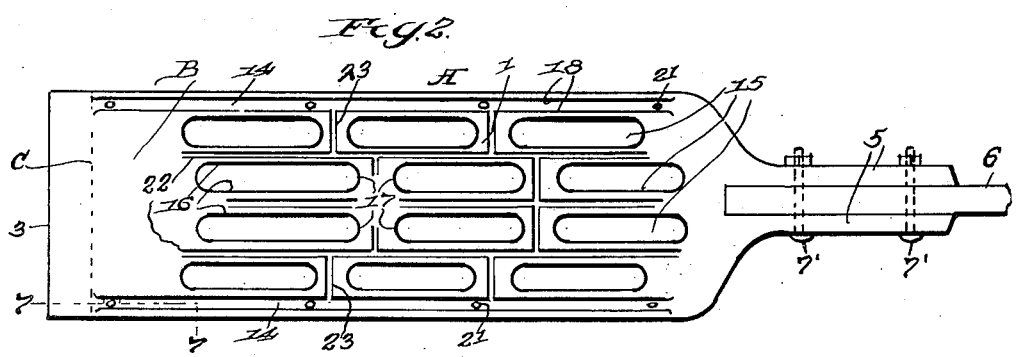
INVENTOR
Frank A. Jawort
BY
ATTORNEY Patented June 4, 1935

2,003,541

UNITED STATES PATENT OFFICE 2,003,541

BAKER'S PEEL

Frank A. Jawort, Spokane, Wash., assignor of one-half to J. A. Westland, Spokane, Wash.

Application October 16, 1934, Serial No. 748,494

7 Claims. (Cl. 107—67)

The object of this invention is to provide a new baker's peel.

One of the primary objections to wood and pressed or stamped baker's peels now in use is that the smooth surface permits the pans to slide freely and frequently slide off from the peel entirely as the latter is being withdrawn, and also as the peel is being projected into the oven to scoop the pans onto it.

It is a feature of this invention to provide a baker's peel with an unfinished and somewhat rough surface to resist sliding movement of the pans, and it is a special feature of the invention to make a peel of unfinished cast aluminum.

In order to minimize the drag which such a material as aluminum would impose, it is a feature of the invention to provide the peel with anti-friction or steel runner strips to take the wear and reduce drag to a minimum.

A further feature consists in a novel manner of securing the runner strips whereby the ends thereof will be protected from wear and disruption, and whereby forward portions of the strips may serve as fulcrums about which the peel may be tilted to dispose its front pan scooping edge into or out of engagement with the oven deck.

In addition to providing a peel presenting a rough surface, it is a feature of the invention to make such surface entirely flat and provide the same with a plurality of friction edge portions to resist sliding movement of the pans.

The invention has other features and objects which will be more fully described in connection with the accompanying drawing and which will be more particularly pointed out in and by the appended claims.

In the drawing:—

Fig. 1 is a view in side elevation showing my novel peel resting on a flat surface such as the bottom or deck of an oven.

Fig. 2 is a top plan view thereof.

Fig. 3 is a view in plan of the bottom of the peel.

Fig. 4 is a transverse sectional view on line 4—4 of Fig. 3.

Fig. 5 is a similar sectional view on line 5—5 of Fig. 3.

Fig. 6 is a view in side elevation showing how the front pan scooping edge is tilted on runner fulcrums into engagement with the oven deck to scoop a pan onto the peel.

Fig. 7 is an enlarged sectional view on line 7—7 of Fig. 2 showing how one end of a runner is projected into and structurally engaged by a portion of the peel body.

Like characters of reference designate similar parts throughout the different figures of the drawing.

My improved peel comprises a blade-like body which I will generally indicate at A. The top 1 of said peel body is continuously flat and includes a longitudinally disposed central web portion 2, which is substantially the same thickness throughout the length and width of the peel. The front end is shaped and formed to function as a pan scoop and the same has a scooping straight edge 3 which extends throughout the width of the peel. As shown in Figs. 1 and 6, I chamfer or taper the peel from line 4, wholly on the upper portion of the latter, down to edge 3, so that the resulting bevel is taken from the upper portion of the stock thereby leaving the bottom continuously straight. The rear end of the peel is provided with a pole attaching device which, as shown, takes the form of forked arms 5, between which a pole 6, may be secured by means such as bolts 7'.

As may be seen from Figs. 4 and 5, which are sectional views taken near extreme ends of the peel, the web 2 is substantially of uniform thickness and in order to stiffen and strengthen this web, I provide the same with depending ribs or flanges 7, of increasing thickness toward the rear of the peel. The forward ends of these flanges taper off to a vanishing point and merge into the lower face 8, of the peel, near the forward end thereof but slightly rearwardly from the scooping edge 3. Near the rear of the peel, these flanges are widened and thickened at 9, and converge and join the bight 10, of arms 5.

In the lower faces of ribs or flanges 7, I form shallow runner strip channels 11, as shown in Figs. 4, 5 and 7, and the end of each channel terminates in a pocket 12 that is provided with an abutment shoulder 13, the pockets 12 being somewhat recessed into the stock of the flange 7. As both ends of each channel are similarly equipped, and for the same purpose, only one end need be shown and described. Above, and in superposed registry with the channels 11, are two shallow channels or grooves 14, disposed closely to the sides of the peel, and recessed from the flat top 1 thereof.

Intermediate the flanges 7, I provide a series of weight reducing openings 15 in the web 2, preferably in staggered relation and extending from the rear of the peel toward the scooping edge 3 but sufficiently rearwardly therefrom so as not to intersect the front imperforate part designated at B. These openings or slots 15, provide a plurality of friction edges 16, which are elongated and which extend longitudinally of the peel and serve to resist lateral sliding movement of the pans. The ends 17, of said slots, serve to resist endwise movement of the pans. The edges 18, of grooves 14, also function to present frictional resistance to lateral sliding movement of the pans once they are located on the peel, and that is one reason for making the upper channels 14 of a width equal to the lower channels 11.

I have discovered that a cast aluminum peel, unfinished so that the roughness of the casting becomes effective, will enable me to provide a peel with a continuously flat top unbroken by projections. After the pans have been scooped onto this aluminum peel, the roughness of the unfinished casting functions in an effective manner to retain the pans against sliding movement in any direction thereon.

However, the friction edges presented by the channel portions 18 and the margins of the openings 15 very greatly aid in preventing slippage of the pans. Further, I find that aluminum does not permanently stain when fruit juices of pies spill over onto the peel, as the latter is readily cleaned and always presents a bright surface that is very sanitary both in appearance and in fact. Further, the heat of the oven does not tarnish or blacken aluminum as it does wood and many other materials, of which peels have heretofore been made. Aluminum is also sufficiently rigid and tough to withstand relatively hard usage and the scooping edge retains its form over a long period of time. By smoothing off the front top portion from edge 3, back to approximately dotted line C, I find that the pans readily slip onto the peel without being dented as the resistance to sliding movement is appreciably lowered by the smooth area extending rearwardly from edge 3. Then after the pan is disposed on the flat top of the peel, the rougher area, which amounts to a minutely stippled area, is very effective in resisting slippage of the pans, as it will be understood that one peel, such as mine, with an effective pan area of twenty one inches long by seven and one quarter inches in width, will hold at least two large pans and from three to four small pans. I have also discovered that aluminum does not sweat under heat and thereby become slippery.

However, cast aluminum would impose a very considerable drag if allowed to come into contact with the bottom or deck of an oven for the very reason that it is rough when cast and because in the absence of a lubricant, aluminum has a very high coefficient of traction friction.

I will therefore next explain a feature of the invention for reducing the drag of inserting and withdrawing the peel along the oven bottom or deck.

In the bottom channels 11, formed in flanges 7, I dispose runner strips 19, preferably of steel or any hard metal that wears smooth and into a friction reducing condition. These strips 19 are sufficiently thick to slightly project from the shallow channels 11 sufficiently to sustain the peel out of direct engagement with the plane on which it is advanced. These runnerstrips 19 extend practically the effective length of the peel although they terminate slightly rearwardly of the front scooping edge 3, thereof.

I will next describe a very special feature of the invention relative to these strips and the additional function they perform.

The ends of the strips are bent as shown at 20, and the terminals thereof project into the pockets 12 and into endwise engagement with the abutment shoulders 13 of said pockets. I preferably although not necessarily taper off the terminal ends to more easily fit them into said pockets and against said shoulders 13. Thus it will be seen that I not only protect the terminal ends of the strips against wear and disruption, but I also structurally engage the ends of the strips with the peel to prevent endwise displacement of the strips in either direction as a result of running engagement on the oven deck. Between the ends of said strips 19, I apply fastening devices such as rivets 21, which extend through the web and are shown counter-sunk at both ends. It will now be clear why the upper channels 14 are interdependently related to the lower channels 11, by reason of the fact that they are disposed in superposed registry. Thus I can utilize the upper channels for preventing upper heads of the rivets from forming projections.

Further, as a result of the structural engagement of the ends of the runner strips with the peel, I prevent the rivets from being sheared off.

I will next describe a very special feature of the invention resulting from this novel disposition of the strips.

By disposing the forward ends of the strips 19, slightly in the rear of the scooping edge 3, and by bending the strips at 20, the bights of these forward bends form effective fulcrums on which the peel can be tilted to dispose or lower edge 3, into a position to scoop a pan or pans, and then by lowering the rear end of the peel, I can elevate the edge 3 out of engagement with the oven deck and dispose the entire weight of the peel onto the runner strips. By this novel arrangement, I greatly save the forward edge 3 and prolong its life. It will be clear why I prefer to make the lower flanges 7 continuously straight and bevel the portion B wholly on the top thereof, as clearly shown in Figs. 1 and 6. This makes the fulcrum bends far more effective as it does not have to have such an extent of projection as it would otherwise require.

It is a feature of my invention to cast or otherwise groove the top face and I have herein shown longitudinal grooves 22 and transverse grooves 23, which intersect, and the outermost transverse grooves 23 also intersect the channels 14. These grooves are interposed between the openings 15, in the manner shown in Fig. 2. This provides an effective criss-cross of friction edges which effectively function to prevent pan slippage.

When I refer to the flat top of my improved peel, I mean that it has a major plane above which there are no projections, all the friction edges being formed either by the openings 15 or the recessed portions such as the channels 14 and the grooves 22 and 23.

It is believed that my invention will be fully understood from the foregoing description, and while I have herein shown and described one specific form of my invention, I do not wish to be limited thereto except for such limitations as the claims may import.

I claim:—

1. In a baker's peel, a peel body having a flat top and a front scooping edge and the bottom having runner end abutment pockets, and runner strips secured to the bottom of said body and the front ends of said strips being bent to project into and endwise engage said abutment pockets, whereby the bent portions of said runner ends will form wearing fulcrums on which the peel body may be tilted to cause said scooping edge to engage the deck of the oven.

2. In a baker's peel, a peel body having a flat top and a front scooping edge and the bottom of said body having runner end shouldered abutment pockets disposed slightly rearwardly of said scooping edge, and runner strips secured to the bottom of said body and the front ends of said strips being bent to project the bent ends thereof into said pockets with the ends of the runners in endwise abutment with the shoulders of said pockets to structurally hold said runners against endwise displacement in one direction, the bent portions of said runner ends forming wearing fulcrums on which the peel body may be tilted to cause said scooping edge to engage the oven deck.

3. In a baker's peel, a peel body having a flat top and a front scooping edge, the bottom of said body having runner end pockets with abutment shoulders slightly rearwardly of said scooping edge, and runner strips secured to the bottom of said body and the front ends of said strips being reduced and bent to project the bent ends thereof into said pockets with the ends of said runner strips engaging said shoulders to structurally hold said runner strips against displacement in one direction, and the bent portions of said runner strips forming wearing fulcrums on which said peel body may be tilted.

4. In a baker's peel, a peel body cast from one kind of metal and having shallow runner strip receiving channels on its lower face extending longitudinally of said body and terminating in pockets having abutment shoulders, and runner strips of a kind of metal different from that of which the body is formed and said strips being anchored in said channels and of sufficient thickness to project therefrom and take the wear, and the ends of said strips being bent and projecting into said pockets and against said shoulders thereof to structurally hold said strips against endwise displacement in either direction and protect the ends of said strips against wear.

5. In a baker's peel, a peel body of thin blade-like form having longitudinally disposed sets of channels on its upper and lower faces near the sides of said body with said channels in superposed registry and the edges of the upper channels forming pan friction surfaces, and runner strips in the lower channels of sufficient thickness to project therefrom and take the wear, the ends of said lower channels terminating in pockets and the ends of said runner strips being bent and projecting into said pockets to protect the ends of said strips, and fastening devices extending through said strips and body and located between and being protected by the edges of said upper channels.

6. In a baker's peel, a peel body of unfinished cast aluminum and of thin blade-like form having a flat top and a front pan scooping edge and a rear pole fastening device, said peel body having a series of openings therein to form a plurality of friction edges for resisting sliding movement of the pans thereon, and anti-friction runner strips secured to the bottom face of said peel body to reduce friction drag and take the wear.

7. In a baker's peel, a peel body of unfinished aluminum and of thin blade-like form having a flat top and a front pan scooping edge and a rear pole fastening device, said peel body having a series of openings therein to reduce weight and form a plurality of pan friction edges, and said peel body having longitudinally disposed shallow channels along the sides thereof forming pan friction edges, and steel runners secured to the bottom face of said peel body to take the wear and reduce friction drag.

FRANK A. JAWORT.